Figure 1:
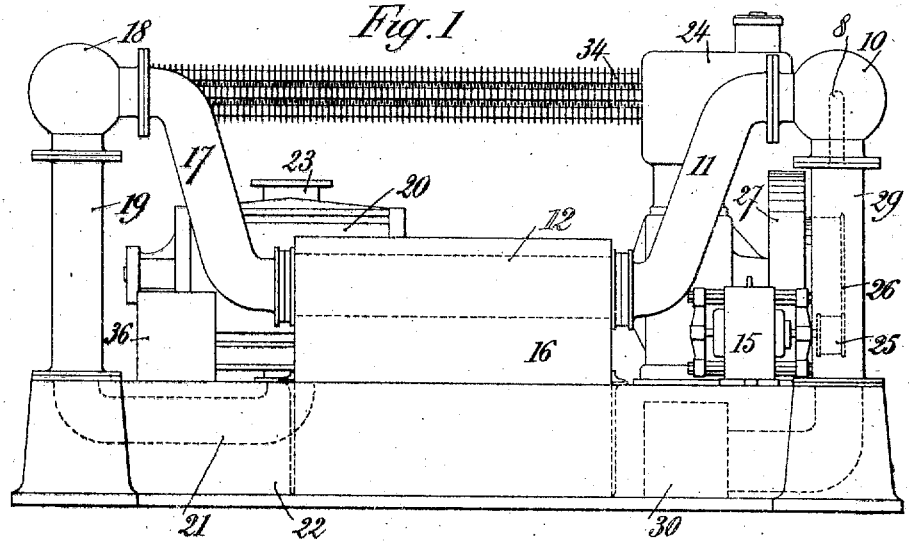

No. 883,036. PATENTED MAR. 24, 1908.
R. MAROT.
APPARATUS FOR PRODUCING A GASEOUS MIXTURE HAVING DISINFECTING
AND EXTINGUISHING PROPERTIES.
APPLICATION FILED JULY 7, 1904.

2 SHEETS—SHEET 1.

Witnesses:
Henry Thieme
F. George Barry.

Inventor:
René Marot
by attorneys
Brown Seward

No. 883,036. PATENTED MAR. 24, 1908.
R. MAROT.
APPARATUS FOR PRODUCING A GASEOUS MIXTURE HAVING DISINFECTING AND EXTINGUISHING PROPERTIES.
APPLICATION FILED JULY 7, 1904.
2 SHEETS—SHEET 2.
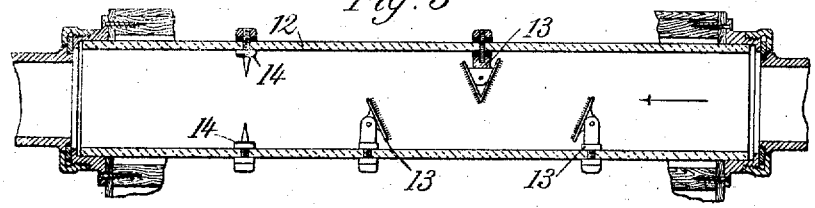
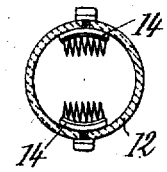
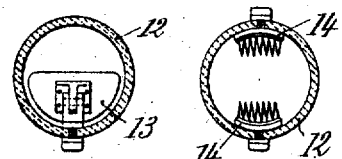
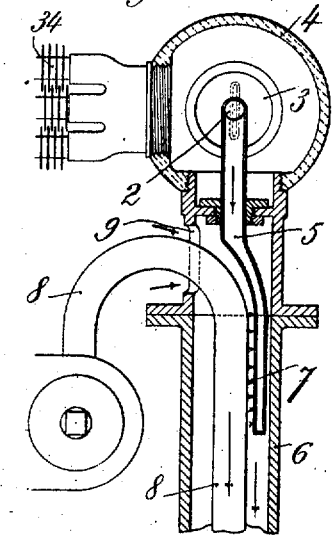
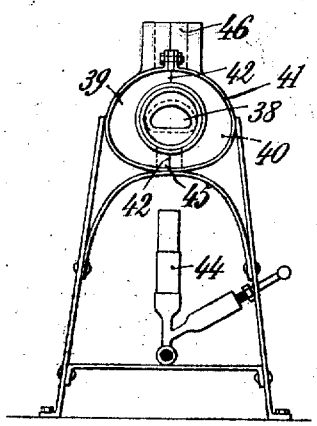
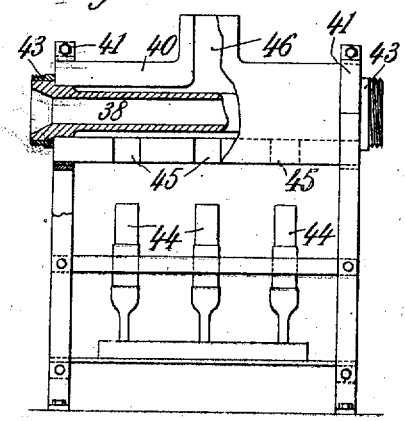

UNITED STATES PATENT OFFICE.

RENÉ MAROT, OF PARIS, FRANCE.

APPARATUS FOR PRODUCING A GASEOUS MIXTURE HAVING DISINFECTING AND EXTINGUISHING PROPERTIES.

No. 883,036.   Specification of Letters Patent.   Patented March 24, 1908.

Application filed July 7, 1904. Serial No. 215,682.

*To all whom it may concern:*

Be it known that I, RENÉ MAROT, citizen of the Republic of France, and resident of 79, Avenue Malakoff, Paris, in the said Republic, engineer, have invented a new and useful Apparatus for Producing a Gaseous Mixture Having Disinfecting and Extinguishing Properties, of which the following is a specification.

Apparatus are known for blowing into any space or place a gaseous mixture either for the purpose of disinfecting such space or place, or for the purpose of extinguishing a conflagration therein. It has been recognized, however, that if mixtures of this kind used hitherto are often capable of destroying insects and vermin, fleas, bugs, rats etc. they are not always effective for destroying microbes and germs.

The present invention relates to a process for preparing a gaseous mixture capable of producing this two-fold effect, while possessing extinguishing properties, as well as to an apparatus for practicing this process and for blowing the gaseous mixture, whether for hygienic purposes or for extinguishing conflagrations.

The gaseous mixture in question consists of a mixture of sulfur dioxid and air which has been transformed in part into sulfuric anhydrid by a special process before it is blown by means of a fan into the inclosed space which is to be disinfected, or in which a conflagration is to be extinguished, such as a house, a warehouse, a granary, a coal store or the hold of a ship etc. This mixture is used dry so that any damage to furniture, carpets or merchandise is avoided.

To practice the invention a mixture of sulfuric dioxid and atmospheric air is passed into an inclosed space such as for example a glass tube, where the mixture is submitted to the action of the silent electric discharge and of the electric sparks which effects the formation of sulfuric anhydrid by the oxidation of the sulfur dioxid by the oxygen of the air, the latter being itself partially ozonized. The ozone thus formed is endowed with a considerable power of killing microbes and disinfecting, so that the mixture is the more appropriate for hygienic purposes.

In certain cases, for example if the electric part of the apparatus cannot act, the action of electricity may be exchanged for that of heat in order to produce the oxidation that gives rise to the sulfuric anhydrid. There is then substituted for the glass tube a retort or chamber wherein the gaseous mixture is heated to a suitable temperature by an appropriate fire. The gaseous mixture which has thus acquired the desired toxic and germicide properties, is forwarded by the action of the fan into the space to be disinfected in quantity which may be varied according to the degree of concentration it may have and to the exigencies of each case, so that by mixing with the surrounding air it creates in this space a toxic atmosphere which is allowed to remain until the germs or animals that are to be exterminated have been destroyed. The fan which serves to blow the gaseous mixture, and the electric generator that supplies current to the coils which produce the silent discharge and sparks, are controlled by a suitable motor, preferably a spirit motor, and all are advantageously arranged on a single base so as to form an apparatus which is compact and easily handled.

The accompanying drawings show by way of example such a complete apparatus for producing the mixture of atmospheric air and sulfur dioxid, submitting it to the action of the silent discharge and sparks to make it toxic and for then forwarding it into the space where it is to act.

Figure 2:
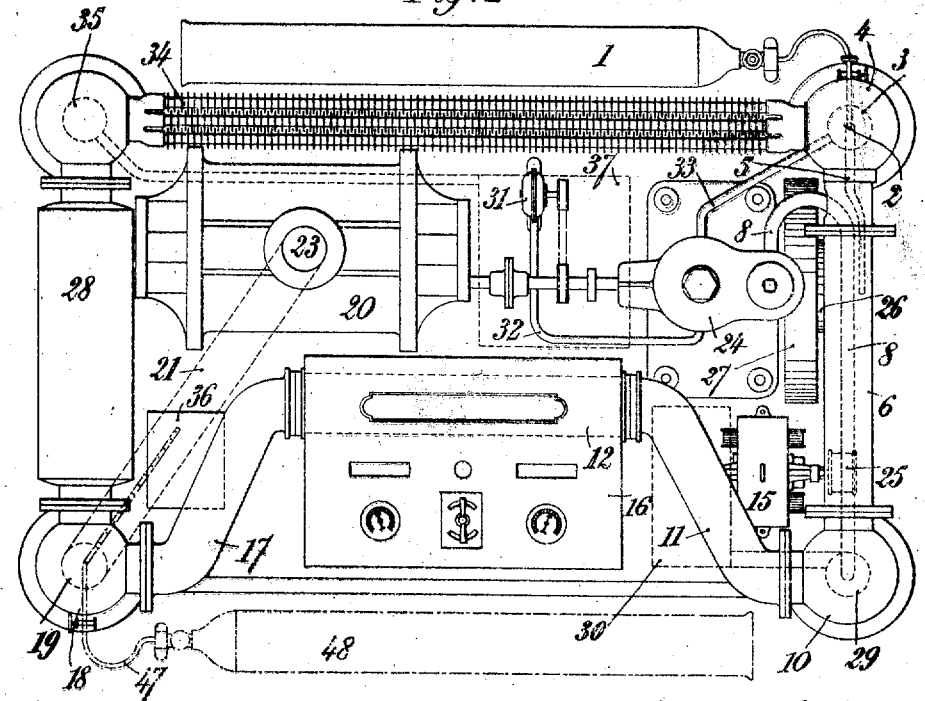

Figure 1 is an elevation and Fig. 2 a plan of the whole apparatus; Fig. 3 is a longitudinal section drawn to an enlarged scale of the glass tube in which is produced the silent discharge and the sparks; Figs. 4 and 5 are cross sections of the tube shown in Fig. 3, showing an arrangement of electrodes for the silent discharge and the sparks. Fig. 6 is a horizontal part section showing the details of the admission of the sulfur dioxid into the apparatus; Fig. 7 is an end elevation and Fig. 8 a side elevation partly in section of an arrangement that may be substituted for the electric part of the apparatus, when heat is used instead of electricity for producing the toxic mixture.

The sulfur dioxid used is preferably in the liquid form in bottles. The bottle of sulfur dioxid 1, Fig. 2, is laid at the rear part of the apparatus. It is in communication through a pointed adjustable valve with the lower part of the tube 2 which admits the sulfur dioxid. The pressure within the bottle suffices to force the liquid to rise in the tube 2 and to feed the apparatus with a quantity of sulfur dioxid adjustable by the valve. The tube 2 rises through the interior of the right hand rear column 3, Figs. 2 and 6. Through the interior of this column also rises around the tube 2 the water which has cooled the spirit motor and which thus yields its heat to the sulfur dioxid. In order to increase the transmission of this heat, it is preferable to make the tube 2 of flattened form as represented in dotted lines in Fig. 6. When the tube 2 has arrived at the enlargement 4 which forms the top of the column 3 it is bent forward forming a branch 5 within the horizontal conduit 6. This branch 5 has a series of small openings 7 through which the sulfur dioxid while still in a liquid state escapes and evaporates as it impinges on the exhaust pipe 8 of the spirit motor. The intense cold produced by the evaporation of the dioxid is thus counteracted by the heated exhaust gases of the motor, and the issue of the dioxid through the series of small openings avoids the deposition of ice and hoarfrost which are always produced by the evaporation of a larger jet. In the conduit 6 the gasified dioxid becomes mixed with the air which enters from the outside through the opening 9 as indicated by the arrows in Fig. 6, being aspirated by the action of the fan.

The gaseous mixture arrives at the front right hand enlargement 10, Figs. 1 and 2, passes into the bent pipe 11 and then as indicated by the arrow in Fig. 3, into the glass tube 12 where it is subjected to the electric action first of the silent discharge and then of the sparks, which action produces a small quantity of sulfuric anhydrid. The oxygen of the air is at the same time partially converted into ozone, a gas which is essentially a germicide, and adds its action to the hygienic properties of the mixture. The silent discharge and sparks pass between the electrodes 13, 13, 13 and 14, 14, respectively with which the glass tube is provided and the terminals of which are connected with the secondary terminals of a series of coils receiving their primary current from a small dynamo 15 of any suitable type. The coils which are not shown in the drawing, are arranged within a wooden box 16 standing on the base of the apparatus. This box 16 also contains the tube 12 which is fixed therein for example by means of the arrangement shown in Fig. 3. This position of the glass tube within the coil box has the advantage of preserving it from external shocks and of protecting the terminals of the high voltage conductors from being handled.

On the top of the coil box are the measuring apparatus, the voltmeter, ampere meter, etc., as well as the current interrupter, and the top has a window through which the behavior of the silent discharge and the sparks in the tube 12 can be viewed.

The electrodes of the silent discharge 13, Figs. 3 and 4 are preferably provided with little points of metallic wire, thus forming small cards between which the silent discharge passes. The electrodes 14 for the sparks, Figs. 3 and 5, comprise a series of points, like the teeth of a comb. The gaseous mixture thus submitted to the electric action is partly transformed into sulfuric anhydrid and ozone which give it its desired properties as a poison and a germicide. It passes into the bent tube 17, then into the front left hand enlargement 18, descends in the front left column 19 and is drawn therefrom by the fan 20 through the horizontal conduit 21 arranged under the base of the apparatus 22. The fan 20 is preferably of the Root type as is represented in Figs. 1 and 2. This fan forwards the toxic gaseous mixture through the tubulure 23 which is connected by appropriate ducts with the space to be disinfected; the latter is thus filled little by little with a certain quantity of sulfur dioxid and sulfuric anhydrid containing some ozone. The fan and the dynamo 15 which furnishes current to the coils are driven by any suitable motor, preferably a spirit motor 24. This motor which does not run at too great a speed drives the fan directly by a coupling and the dynamo by the intermediary of a belt passing over a pulley 25 and over a pulley 26 of the flywheel 27. The motor 24 is fed from a spirit reservoir 28; its ignition coils and accumulators are represented at 36. Its exhaust gases escape by the pipe 8 which serves, as already stated, to heat the sulfur dioxid as it enters the apparatus. This exhaust pipe 8 is extended to the front right hand enlargement 10 whence it opens into the interior of the front right hand column 29 which communicates directly with a silencer 30 situated beneath the base 22 of the apparatus and shown in dotted lines in Figs. 1 and 2.

The circulation of the cooling water of the motor is as follows:—A small pump 31 driven by the motor 24 sucks water from a vat 37 situated beneath the base 22 and shown in dotted lines in Fig. 2. The water is discharged by the pump into the pipe 32, passes around the motor 24 and cools the latter while it is itself heated. The hot water then passes into the pipe 33 which conducts it to the bottom of the right hand rear column 3. In this column it circulates from the bottom to the top around the tube 2 that conducts the liquid sulfur dioxid which it thus heats beginning to be cooled itself as has been explained. It then passes to the right hand rear enlargement 4 and then into the radiator 34 where its cooling is completed. Finally it returns through the left hand rear column 35 to the vat 37 under the base, whence the pump 31 takes it again for fresh circulation. When a steam engine is used as distinct from a spirit motor, the heating of the sulfur dioxid as it enters the apparatus is effected by the exhaust steam of the motor.

As has been stated above, in certain cases the action of electricity may be exchanged for that of heat to effect the oxidation which produces the sulfuric anhydrid. To this end the coil box 16 is dismounted and is withdrawn from the apparatus together with the glass tube which it contains. The dynamo which is not longer required is disconnected and may be completely removed. In the place of the coil box is introduced the arrangement shown in Figs. 7 and 8 which serves to heat the gaseous mixture to a suitable temperature. This arrangement comprises a fireclay retort 38 of oblong cross section surrounded by a fireclay chamber forming a furnace 39, 40 of the same form but thicker and in two parts, which fit together exactly and are held firmly by bands of iron 41 insuring efficiency of the joints 42. The two ends of the retort 38 are of cylindrical form to allow of there being adapted thereto screwthreaded metal pieces 43 on which are screwed the tubes 11 and 17 connecting the retort with the enlargements 10 and 18, Figs. 1 and 2. These tubes 11 and 17 which are generally of bronze or copper, are exchanged for tubes of iron when heat is used as the means for effecting oxidation, as this metal is less attacked by the toxic gas.

The mixture of air and sulfur dioxid travels up to the tube 11 by the same path and in the same manner as previously described; then it passes into the retort 38 where it is subjected to the action of any sort of fire, such as that of a series of burners 44 whose flames enter into the furnace through openings 45 arranged one over each of the said burners. The flames lap round the retort 38 and then escape by a chimney 46 arranged in the pieces 39, 40. The gaseous mixture thus heated passes into the tube 17 and then into the fan by the same path as that previously described.

It is sometimes desirable to provide a supplementary entrance of sulfur dioxid at 47 Fig. 2, at the bottom of the front left hand column 19. This supplementary supply is destined to cool the gas which issues from the retort at a high temperature and is derived from a second bottle 48 shown in dotted lines in Fig. 2 and connected to a cock fixed to the side of the base. To this cock is fitted a pipe also shown in dotted lines opening into the conduit 21 which pipe is perforated with small holes in such a manner as to diffuse the gas rapidly and thus to obtain a very rapid gasification and a very great and extended chilling effect. The gas entering the retort with a certain percentage of dioxid is heated therein and is then chilled by the addition of the supplementary supply of sulfur dioxid, the percentage of that gas in the mixture being thus increased.

It is evident that the arrangement of the divers elements of the apparatus and certain details of the construction can be modified without changing in any manner the principle of the invention.

Having thus described the nature of this invention and the best means I know of carrying the same into practical effect, I claim:—

1. An apparatus for effecting a reaction between a mixture of sulfur dioxid and air, comprising a fan, a motor for driving the fan, a reservoir adapted to contain liquid sulfur dioxid, a mixing chamber for receiving the sulfur dioxid and air, means for conveying the liquid dioxid to the mixing chamber, a motor, an exhaust pipe from the motor arranged to impart its heat to the liquid dioxid and means for transforming a part of the mixture of dioxid and air into sulfuric anhydrid.

2. An apparatus for effecting a reaction between a mixture of sulfur dioxid and air, comprising a fan arranged to circulate the said gaseous mixture, means arranged to drive the said fan, a reservoir adapted to contain liquid sulfur dioxid, a perforated duct for permitting the liquid dioxid to escape into a mixing chamber, an exhaust pipe from the motor arranged in position to receive thereon the liquid dioxid as it escapes from the perforated duct, means for circulating water around the motor, means for circulating the motor cooling water around the duct through which the liquid dioxid passes, a glass tube, electrodes in the said glass tube, a mixing chamber for mixing the liquid dioxid with air, means for conducting the mixture of dioxid and air to the glass tube, coils connected to said electrodes for producing a silent electric discharge and electric sparks in said glass tube and a dynamo adapted to supply current to the said coils and driven by the said motor.

In testimony, that I claim the foregoing as my invention, I have signed my name in presence of two witnesses, this twenty-fifth day of June 1904.

RENÉ MAROT.

Witnesses:
 HANSON C. COXE.
 ALCIDE FABRE.